United States Patent
Henshaw et al.

(10) Patent No.: US 6,772,531 B1
(45) Date of Patent: Aug. 10, 2004

(54) MEASUREMENT APPARATUS INCLUDING A TRACK FOR A MEASUREMENT SCALE AND APPARATUS FOR TENSIONING THE SCALE

(75) Inventors: James R Henshaw, Stroud (GB); Peter G Holden, Cirencester (GB); Richard J Hoodless, Bristol (GB); Thomas I Mackintosh, Bristol (GB); David R McMurtry, Wotton-under-Edge (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 09/721,880

(22) Filed: Nov. 27, 2000

(30) Foreign Application Priority Data

Nov. 30, 1999 (GB) .............................................. 9928098
May 31, 2000 (GB) .............................................. 0013141

(51) Int. Cl.$^7$ ............................................ G01D 21/00
(52) U.S. Cl. .......................... 33/706; 33/DIG. 1; 33/708
(58) Field of Search ...................... 33/706–710, DIG. 1

(56) References Cited

U.S. PATENT DOCUMENTS

| | | | |
|---|---|---|---|
| 4,541,181 A | | 9/1985 | Giacomello |
| 4,554,741 A | * | 11/1985 | Affa ............................. 33/702 |
| 4,559,707 A | | 12/1985 | Oberhans |
| 4,912,856 A | * | 4/1990 | Ernst ............................. 33/702 |
| 4,926,566 A | | 5/1990 | McMurtry et al. |
| 4,974,962 A | | 12/1990 | Stephens et al. |
| 5,063,685 A | * | 11/1991 | Morrison et al. ............. 33/701 |
| 5,511,321 A | * | 4/1996 | Nelle ............................ 33/702 |
| 5,826,346 A | * | 10/1998 | Reilly .......................... 33/640 |
| 5,842,283 A | * | 12/1998 | Yatsu et al. .................... 33/706 |
| 6,018,881 A | * | 2/2000 | Spies ............................ 33/708 |
| 6,119,359 A | * | 9/2000 | Suzuki et al. .................. 33/706 |
| 6,163,970 A | * | 12/2000 | Nelle et al. ..................... 33/706 |

FOREIGN PATENT DOCUMENTS

| | | |
|---|---|---|
| DE | 34 27 027 A | 4/1985 |
| EP | 0 163 857 A2 | 4/1985 |
| EP | 0 207 121 B1 | 1/1987 |
| JP | A-10-213455 | 8/1998 |

* cited by examiner

Primary Examiner—Diego Gutierrez
Assistant Examiner—Yaritza Guadalupe
(74) Attorney, Agent, or Firm—Oliff & Berridge, PLC

(57) ABSTRACT

There is disclosed: a measurement scale suitable for use with scale reader for determining displacement; various tracks all for holding the scale and all having a channel into which the scale is magnetically attracted; and a scale tensioner which in use tensions the scale in situ by release of a preload, prior to the scale being secured to a substrate, the tensioner being removable thereafter.

3 Claims, 7 Drawing Sheets

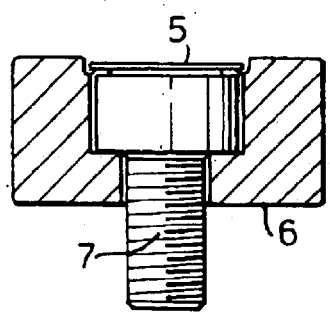
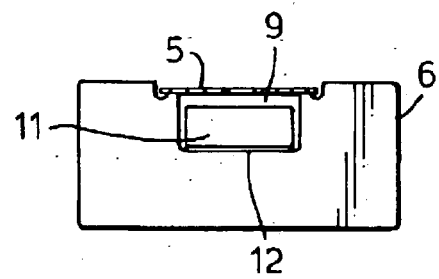
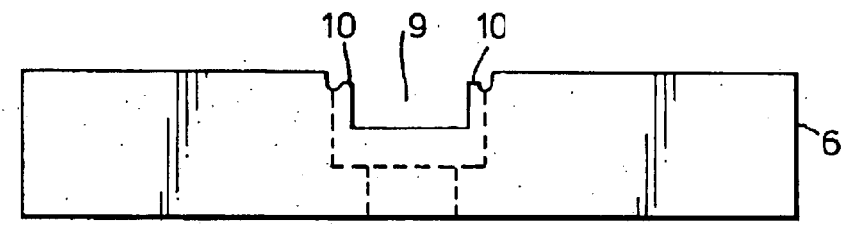
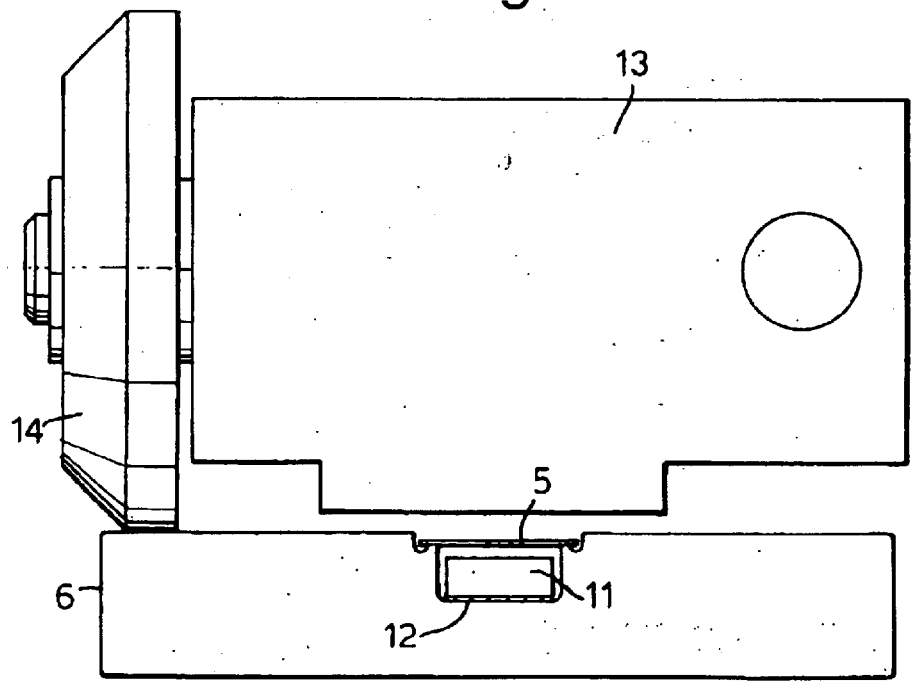

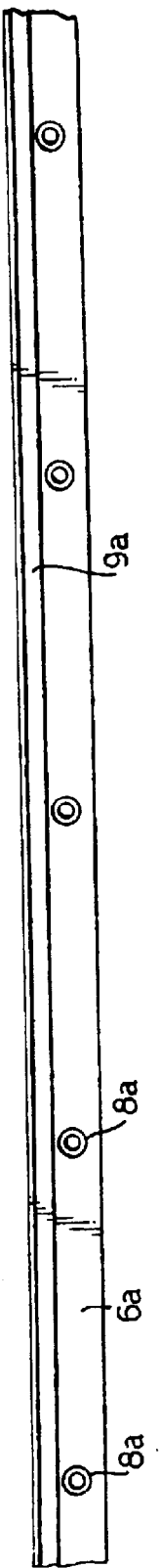
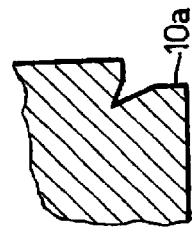
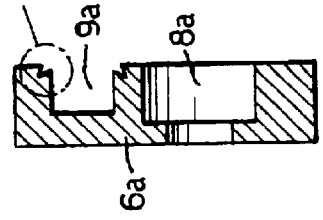
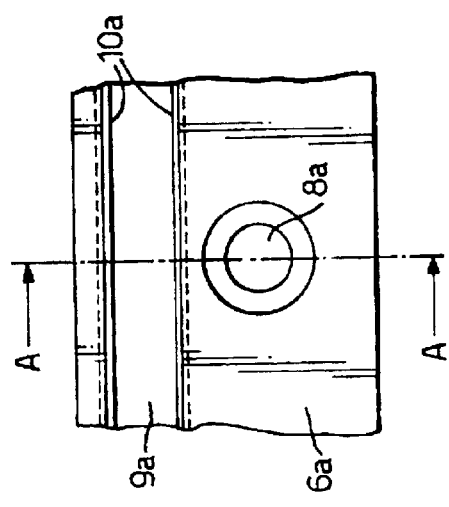

MEASUREMENT APPARATUS INCLUDING A TRACK FOR A MEASUREMENT SCALE AND APPARATUS FOR TENSIONING THE SCALE

FIELD OF THE INVENTION

The present invention relates to a track arrangement for carrying a measurement scale for use in scale, a scale therefor, and to apparatus and a method for tensioning a measurement scale.

DESCRIPTION OF THE PRIOR ART AND SUMMARY OF THE INVENTION

A known form of opto-electronic scale reading apparatus for measuring relative displacement of two members comprises a length of scale on one of the members, having scale marks defining a periodic pattern, a read head provided on the other member, means for illuminating the length of scale, periodic diffraction means for interacting with light from the scale marks to produce interference fringes having movement relative to the read head and detecting means in the read head responsive to the fringes to produce a measure of the displacement.

An example of such apparatus is disclosed in EP-A-0 207 121 and also U.S. Pat. No. 4,974,962. Typically, the length of scale could be of spring steel with a surface layer of copper. U.S. Pat. No. 4,926,566 discloses a method of producing a length of scale, in the form of a flexible tape produced by rolling, the pitch of the scale marks being 20 µm or 40 µm for example.

Conventionally the length of scale may be carried by being received by a track, for example comprising an aluminium extrusion, the lower part of the track being attached to a surface, for example by screws or bolts, and the upper part of the track being formed to receive the length of scale—see FIG. 1 which is a section through a length of track 1 which is attached to a surface 2 by screws 3 spaced apart along its length and lengths of clamping strip 4, the upper part of the track 1 receiving a length of scale 5 which has been slid into it.

The upper part of track 1 has scale holding elements 1a for keeping the scale in place.

However, such an arrangement can be difficult to make and to install. The small ride-height tolerance of a typical read head means that the track 1 requires accurate manufacture. The necessary clearance for the sliding fit of the scale 5 in the track 1 demands that the scale be manufactured even more accurately to compensate for this clearance.

It is not desirable to clamp the scale 5 securely to the track 1 because there may be relative thermally induced movement between the scale and track, particularly if dissimilar metals are used. For this reason the prior art track shown in FIG. 1 allows sliding movement of the scale. The scale will produce more accurate readings if it is held at a fixed position, both lengthwise and laterally but should not be clamped to the track, and should not be subjected to any deviations in the forces holding it in position.

According to one aspect of the present invention there is provided an elongate track comprising a channel, the channel being adapted for holding a measurement scale therein, wherein the track is adapted for attracting magnetically the scale to the channel of the track.

The track could have magnetic material (for example a length of flexible magnetic material such as ferrite rubber) for holding the scale magnetically. In this case, the length of magnetic material could be in the channel of the track, the scale being above the length of magnetic material, for example sitting on edge portions (which are, for example, below the upper surface of the track) along respective sides of the channel.

The track could be attached to the surface by screws passed through holes in it. Such holes could be at the bottom of the channel or in the track alongside such a channel.

The track could be machined or an extrusion, for example an aluminium extrusion.

Alternatively the track could be a length of magnetic material for example ferrite rubber, having the channel formed integrally therein.

The invention extends to a track and scale therefor.

It has been found that the scale may lift from a track or similar support under conditions where it is under compression. The present invention according to a second independent aspect relates to a scale tensioner, an embodiment of which prevents lifting of a scale.

One scale tensioning device is described in U.S. Pat. No. 4,559,707(Oberhans). However this and other scale tensioners are directed to correcting errors in the scale's pitch rather than to prevent lifting.

The constructional details of these prior art tensioners differ from the proposed invention which provides a measurement scale tensioning device comprising a preloadable resilient member operable to urge the scale into tension.

The device may include a resilient member loading part operable to preload the member and operable to release the load.

The invention according to yet another aspect provides a method of tensioning a measurement scale, comprising the following steps:

providing a measurement scale, and scale tensioner;

preloading the scale tensioner;

mounting the scale to a substrate;

securing one end of the scale to the substrate and clamping the tensioner to the substrate adjacent the other end of the scale;

releasing the preload in the tensioner to cause a tension in the scale; and securing the said other end of the scale to the substrate whilst maintaining the, tension in the scale.

Preferably the method includes the step of providing a track to house the scale.

The invention extends to a method for tensioning and if necessary repeating the tensioning.

BRIEF DESCRIPTION OF THE DRAWINGS

The present invention will now be described, by way of example, with reference to the accompanying drawings, in which:

FIG. 4 is a section through the length of track and showing a screw through a hole in it;

FIG. 5 is a section through the length of track and showing a length of scale held on it;

FIG. 6 is a section through a wider form of track;

FIG. 7 shows a use of the wider form of track;

FIG. 8 is a plan view of a length of track forming a further embodiment of the invention;

FIG. 9 is an enlarged view of part of the track of FIG. 8;

FIG. 10a) is a section through A—A of FIG. 9, FIG. 10b being an enlarged view of part of FIG. 10a);

DESCRIPTION OF THE PREFERRED EMBODIMENTS

Figure 1:
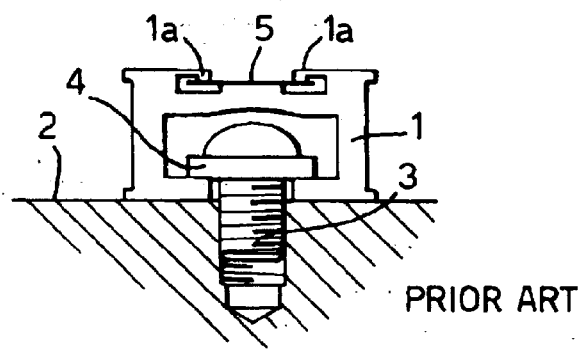
FIG. 1 is a section through a known arrangement for carrying a length of scale by a length of track.
Figure 2:
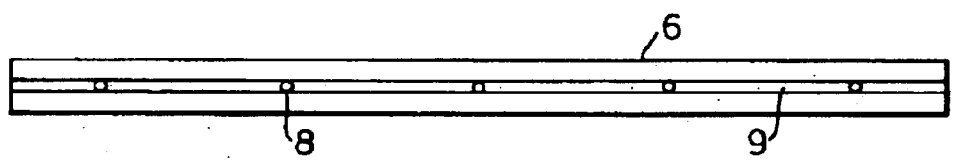
FIG. 2 is a plan view of a length of track forming a first embodiment of the invention according to the first aspect of the invention.
Figure 3:
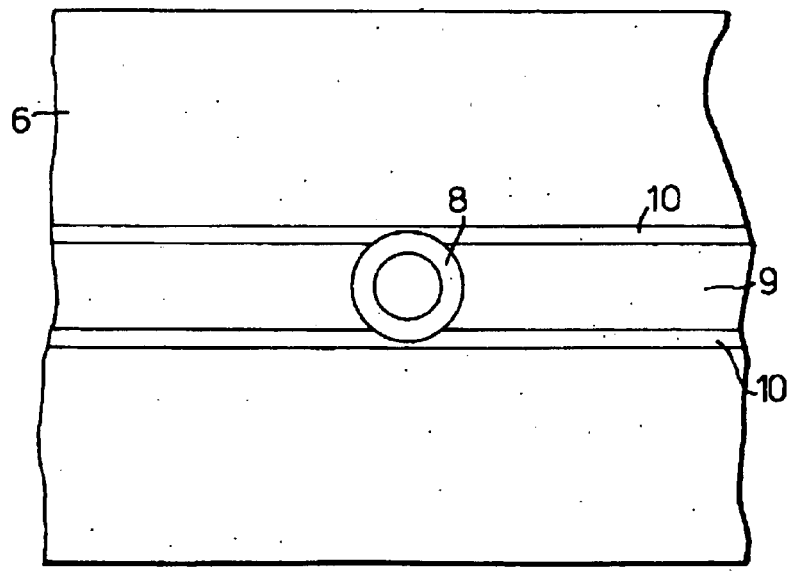
FIG. 3 is an enlarged view of part of the length of track of FIG. 2.

Referring to FIGS. 2–5, a length of aluminium extrusion provides a length of track 6 attachable to a surface by screws 7 passed through holes 8 spaced apart (for example with a pitch of 10 cm) along the length of track 6. The length of track 6 is formed with a channel 9 running centrally along its length, the holes 8 being at the bottom of the channel 9. Also, along each side of the channel 9 is an edge portion 10 below the upper surface of the length of track 6.

With lengths of track 6 attached to a surface by screws 7, between each pair of holes 8 there is laid a strip 11 of flexible magnetic material, held on to the bottom of the channel 9 by a strip 12 of double-sided adhesive tape. By way of example, the strips 11 could be strips of ferrite rubber such as that provided by Magnet Applications Limited, of Northbridge Road, Berkhamsted, Hertfordshire HP4 1EH, England. Then, a length of scale 5 (for example for use in opto-electronic scale reading apparatus) is laid on to the edges 10 and held magnetically in place on the track 6 by the strips 11 of flexible magnetic material.

FIG. 6 shows a section through a wider length of track 6 for use in the arrangement of FIG. 7 in which a read head carried by a sprung read head carriage 13 runs on the length of track 6. A wheel 14 is fixed via a bracket to the read head carriage 13 and the assembly sprung towards the scale 5. The wheel runs on the length of track 6, maintaining the correct scale to read head gap substantially irrespective of undulations and steps in the surface to which the length of track 6 is attached.

In the above embodiments, the length of track 6 is formed with a channel 9 running centrally. Referring to FIGS. 8, 9, 10a and 10b an alterative form of length of track 6a comprises an aluminium extrusion formed with holes 8a spaced apart along its length for attaching the track 6a to a surface by screws, the holes being offset from the longitudinal centre line of the length of track 6a Also offset from the centre line is a channel 9a along each side of which there is an edge 10a In use, the length of track 6a is attached to a surface, a strip of flexible magnetic material is held on to the bottom of channel 9a by a strip of double-sided adhesive tape and a length of scale is laid on to the edges 10a and held magnetically in place by the strip of flexible magnetic material. Such a structure may be used, like with the FIG. 7 embodiment, with a sprung read head carriage to which a wheel is attached, the wheel running on the upper surface of the length of track 6 alongside the channel 9a.

Figure 11:
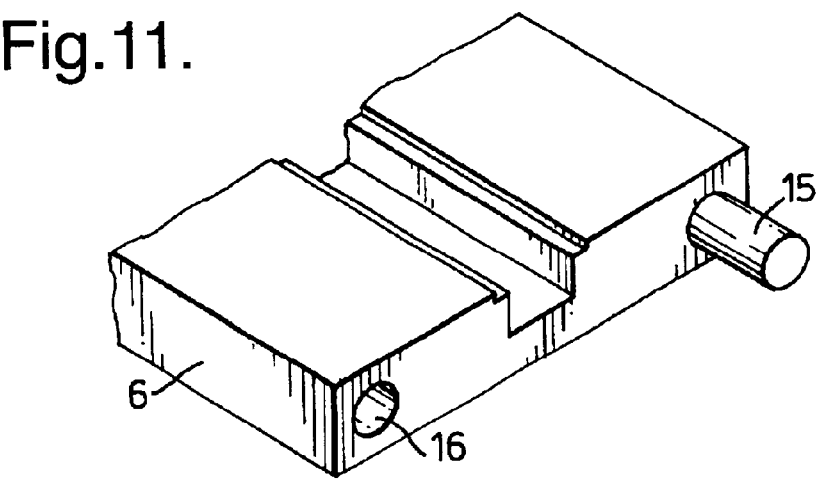
FIG. 11 shows means for fixing lengths of track end to end.

Such lengths of track 6 or 6a may be placed end to end with a small (~0.5 mm) clearance. This is satisfactory unless the surface to which they are attached is uneven. A solution is to make each end of such a length of track as shown in FIG. 11 so two ends plug together by virtue of dowels 15 and holes 16. In practice this could be achieved with two keyhole slots open at the bottom, a suitable dowel-pin being fixed in one of the holes. This enhancement would be particularly useful when used in conjunction with a sprung read head carriage.

Figure 12:
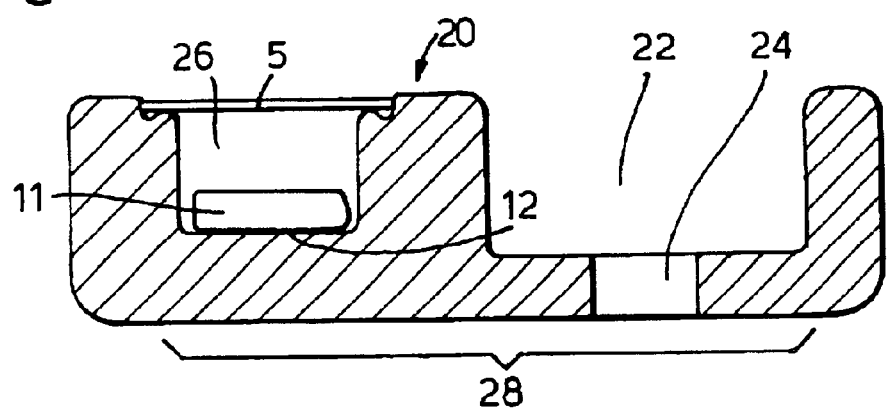
FIG. 12 is a sectional view of another type of track forming another embodiment of the invention.

The scale may take the form shown in FIG. 12. In this embodiment an aluminium extrusion 20, having the profile shown, is used as a scale supporting track. The extrusion 20 has a channel 22 for accommodating heads of securement screws etc which pass through holes 24, shown in hidden detail. A further channel 26 is illustrated. Like the other embodiments this channel 26 accommodates a scale 5 and a magnetic strip 11 for holding the scale in place. The strip is held in place by means of adhesive.

It will be noted that there is a slight concavity 28 to the underside of the track. The purpose of the concavity is to ensure that the underside stays in register with the surface to which it is mounted, and does not form a convexity. A convexity would allow the track to rock or the surface, and thereby reduce control of the height of the scale.

In the above embodiments, the magnetic force holding the length of scale in place should not be greater than necessary since it is useful to minimise sliding frictional force between scale and track. This is achieved by the choice of air gap between the scale and the magnetic material.

Figure 13:
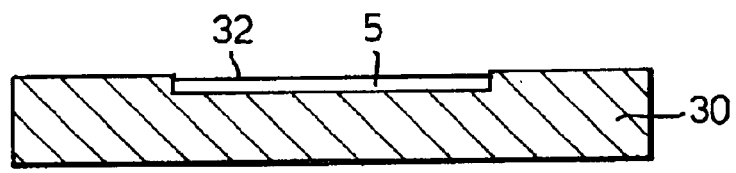
FIG. 13 is a sectional view of yet another type of track forming yet another embodiment of the invention.
Figure 14:
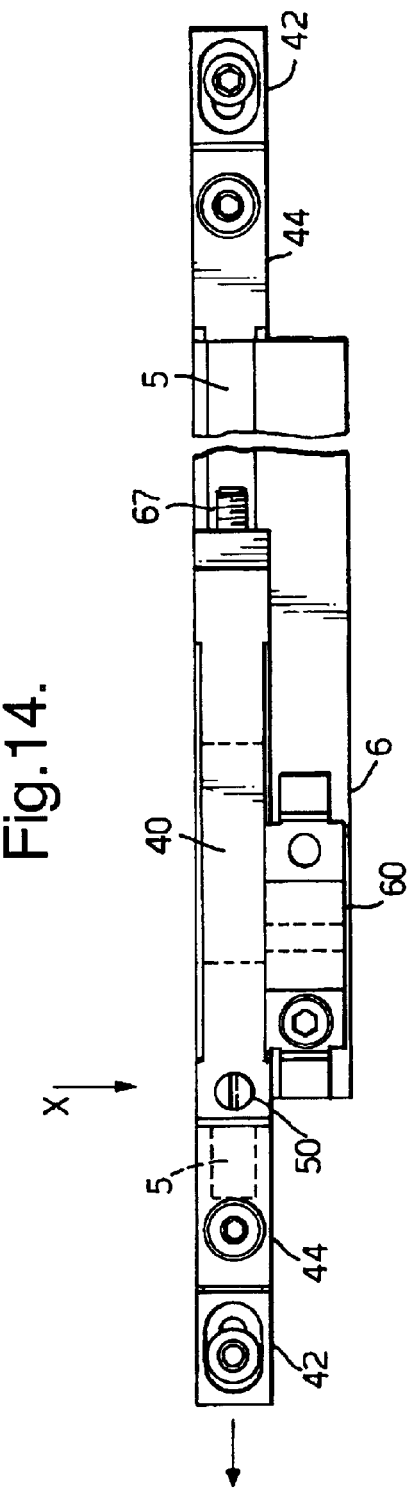
FIGS. 14 & 15 show a plan and side view respectively of a scale tensioning device according to the second aspect of the invention.
Figure 15:
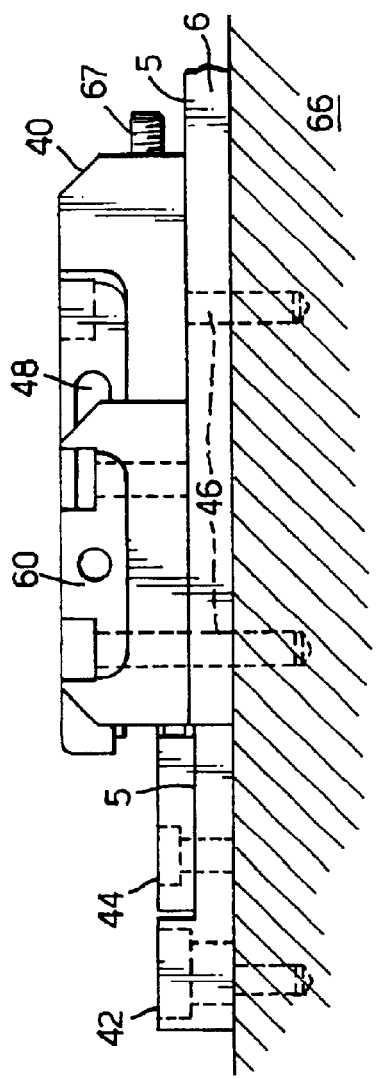

FIG. 13 shows yet another embodiment of the track. In this embodiment a flexible magnetic strip 30 is used to hold the scale 5. The strip is formed from ferrite rubber of the type mentioned above. A channel 32 is formed in the track 30 for holding the scale 5 and provides lateral support for the scale. This track may be held magnetically to a ferrous substrate e.g. a cast iron machine tool bed. In use the track may be temporarily positioned for, say commissioning of the machine and then removed.

A variant (not shown) of the track shown in FIG. 13 has a channel slightly wider than the scale to ensure that any radii at the internal corners of the channel do not lift the scale and distort its height.

The tracks shown in FIGS. 12 and 13 may be employed in a manner similar to manner of use of the other tracks described above.

It will be appreciated that the present invention may be used with scale and scale reading apparatus other than the opto-electronic type—for example scale and reading apparatus which operates by means of magnetic or capacitive detection can be used. Other modifications and variants will be apparent to the skilled addressee. For example the magnetic materials mentioned above might be replaced by electromagnetic elements causing attraction of the scale to the track.

The scale may be magnetised or may have a magnetic strip affixed thereto for co-operation with a magnetic or magnetised part of the track. The scale may gain its magnetic attraction from the substrate to which the track is attached, e.g. the scale may be magnetic and in use is positioned in close proximity (within the channel) to a ferrous substrate like cast iron.

Referring to FIGS. 14, 15, 16 and 17 there is shown a scale tensioner which may be used e.g. to tension any of the scales described above. The tensioner is illustrated with a track similar to that shown in FIGS. 8, 9, 10a & 10b, although a track of any type might be used and in its broadest sense the invention according to the second aspect need not use a track. Tension in the scale prevents the possibility of compression and lifting of the scale.

There is shown a length of track 6 and a scale 5. The scale is secured at each end to a substrate 66 e.g. a machine tool bed. Two clamps, one for each end of the scale; each have two parts 42 and 44. The scale is sandwiched and held between these two parts. The two clamps are secured to the substrate 66 by means of screws. The track 6 illustrated is secured to the substrate also, by means of screws extending through holes 46 in the track 6.

The tensioner comprises a main body 40 having a resilient coil spring 54 housed therein. The spring abuts a plunger 56. The spring 54 is compressible within the body 40 to provide a preload and is held in a compressed state by means of an eccentric pin 52 acting to prevent movement of the plunger 56. The pin 52 is rotatable with shaft 50. The shaft 50 has a slot 62 for manual turning of the shaft e.g. with a screwdriver.

The body 40 is securable adjustably using clamp screw 68 to the support 60 which is in turn securable to the substrate via one of the holes 46 normally used to secure the track to the substrate 66, using bolt 70. Adjustment of the position of the body 40 relative to the support 60 is achieved by means of a slot 48 in the body through which the clamp screw 68 may pass.

In use the scale and track are mounted to the substrate 66, and the two end clamps 42 and 44 are attached to the scale. One end clamp is secured to the substrate (holding the scale) and the other is loosely attached to the substrate (again holding the sale). Support 60 is secured to the substrate via the track mounting holes 46 and the tensioner body 40 is attached to the support and slid toward the loose end clamp i.e. the clamp shown in the Figures. The body 40 in its preloaded state is then tightened to the support.

Figure 16:
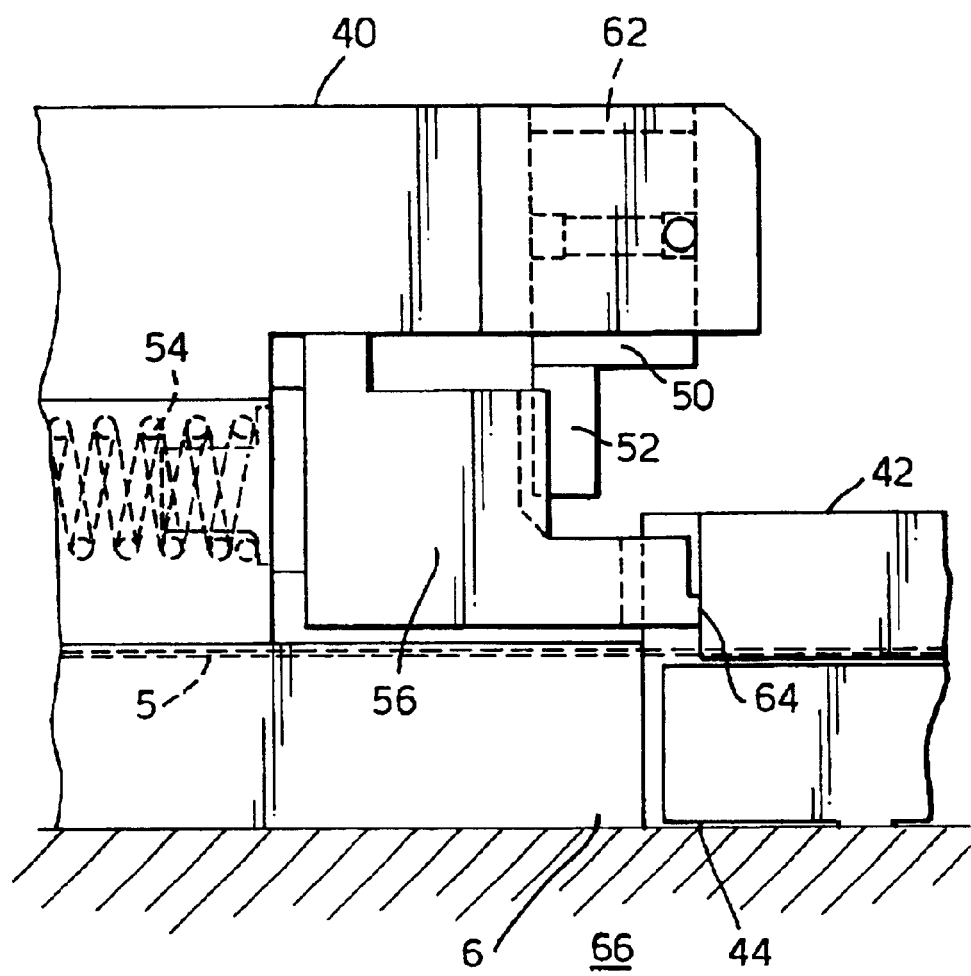
FIG. 16 is an enlarged partial view in the direction of arrow "X" in FIG. 14.
Figure 17:
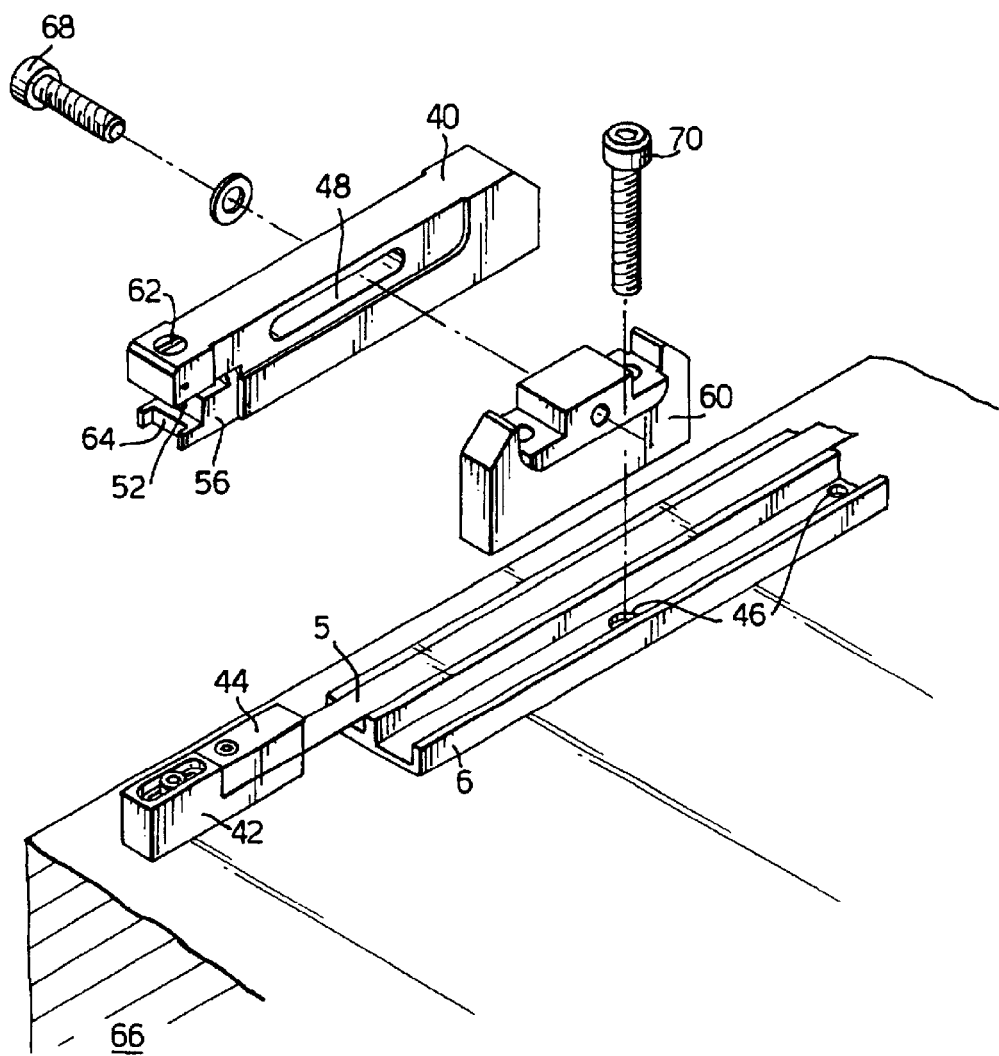
FIG. 17 is an isometric view of the tensioning device, scale and scale track shown in FIGS. 14, 15 and 16.

The body is initially in the condition shown in FIG. 16 i.e. pin 52 holds back the plunger 56 against the force of the spring 54. Slot 62 in the shaft 50 is turned through 180° which moves the pin in an eccentric manner away from the plunger 56. This action releases the tension in the compressed spring and forces the plunger against clamp part 42 (at the abutment point 64 shown in FIG. 16).

The clamp part 42 is attached to the scale 5 so the scale will be forced into tension. The loose clamp can be tightened to the substrate and the body 40 and support 60 can be removed. The scale will remain in tension. The now vacant track securement holes can be used to secure the track.

The preload in the spring is adjustable e.g. to give a correctly calibrated tensioning force. A screw 66 is used to adjust the tension in the spring to give the correct tension in the scale when the plunger is released. It is envisaged that the spring will produce a tension force in the order of 10 to 40 N.

The process of scale tensioning may need to be repeated, particularly when a long scale is being tensioned. Long scales will stretch further than short ones when subjected to the same tension, so the stroke of the pin 52 may be insufficient to induce the required tension in the scale.

In such circumstances the spring 54 can be compressed again by turning shaft 50 and the body 40 can be repositioned to abut once more clamp part 42 at abutment 64. The scale clamp is loosened. The preload in the spring 54 is released by turning the shaft 50 and the scale is thereby tensioned once more.

The clamp is then tightened to the substrate.

The process may be repeated until no more extension is observed when the spring is released.

The period of the marking etc used on a scale under tension may need to be shorter than those on a non tensioned scale because the scale may stretch. A scale with a finer pitch may therefore be provided for use with this tensioner.

Other tensioner modifications and variants will be apparent to the skilled addressee e.g. the spring 54 may be replaced with a gas operated piston, in which case its preload may come from compression of entrapped gas behind the piston, or from a pressurised supply of gas. In either case the piston can be held back under preload by a restraint mechanism e.g. a pin similar to the pin 52.

What is claimed is:

1. A measurement apparatus comprising:

a measurement scale;

a readhead relatively movable along the scale for reading the scale; and a scale track holding the scale, the track having magnetisable material for causing magnetic attraction force between the scale and the track, the scale being spaced from the magnetisable material, the magnetic attraction force between the scale and the magnetisable material allowing relative movement between the scale and the track.

2. A measurement apparatus, comprising:

a measurement scale;

a readhead relatively movable along the scale for reading the scale; and a scale track having a channel and magnetisable material, the scale being held magnetically to the channel, the scale being spaced from the magnetisable material, a magnetic attraction force between the channel and the track allowing relative movement between the scale held in the channel and the track.

3. A measurement apparatus, comprising:

a measurement scale;

a readhead relatively moveable along the scale for reading the scale;

a scale track holding the scale, the track having magnetisable material for causing magnetic attraction force between the scale and the track, the scale being spaced from the magnetisable material, the magnetic attraction force between the scale and the magnetisable material allowing relative movement between the scale and the track; and a scale tensioner for tensioning the scale on the track.

* * * * *